United States Patent Office 3,219,411
Patented Nov. 23, 1965

3,219,411
MANUFACTURE OF RUTILE TiO₂
Gordon D. Cheever, Glen Burnie, Frank O. Rummery, Baltimore, and Joseph D. Richards, Lutherville, Baltimore, Md., assignors to The Glidden Company, Cleveland, Ohio, a corporation of Ohio
No Drawing. Filed Dec. 17, 1963, Ser. No. 331,102
1 Claim. (Cl. 23—202)

This application is the continuation-in-part of our abandoned patent application 169,583, filed January 29, 1962, and having the same title.

This invention relates to an improvement in process for making titanium dioxide, and more particularly to an improvement in such process whereby titanium tetrachloride is hydrolyzed with water to form titanium dioxide and hydrogen chloride.

Heretofore, it has been broadly proposed to hydrolyze titanium tetrachloride to titanium dioxide by the reaction $TiCl_4 + 2H_2O \rightarrow TiO_2 + 4HCl$. In the past liquid water hydrolyses have been attempted, and also steam hydrolyses below about 500° C. In attempts to duplicate this former work we have found that the product we obtained was non-pigmentary and preponderantly in the anatase and/or amorphous form.

We have now discovered that rutile titanium dioxide particles can be made efficiently by impinging streams of super-heated steam and titanium tetrachloride vapor feeds, the steam being in stoichiometric excess for the reaction, in a reaction zone maintained above 800° C. using a combined flow rate of feeds sufficient to provide a superficial feed residence time of at least about 5 seconds in the zone, and withdrawing the resulting hydrolysis products rich in rutile titanium dioxide particles from said zone.

An excess of steam is needed to obtain complete conversion of the titanium tetrachloride efficiently; advantageously we use at least about two and preferably two to three mols of steam per mol of titanium tetrachloride to obtain substantially complete conversion of the tetrachloride, but higher steam/tetrachloride ratios can be used, e.g., 4:1 or even higher. Increasing this ratio increases the hydrolysis rate somewhat. We have found the hydrolysis rate to be extremely fast and the hydrolysis, for all practical purposes, to be complete even at temperatures as low as 300° C.

For our purposes, however, the temperature of the reaction zone must be at least 800° C. When we operated below this temperature, the pigment we obtained from the reaction chamber was practically all anatase or amorphous. Preferably, to obtain 90+% rutile titania particles from the reaction in a zone of practical dimensions, the reaction chamber temperature should be 900–950° C. Higher temperatures can be used, the principal limitations being those of equipment and heat source. Thus, for example, 1100–1200° C. is very favorable for the operation and about 1600° C. is a practical maximum because of equipment limitations. Higher temperature also increases the rate of particle size growth.

In contrast to the oxidation of the tetrachloride with molecular oxygen, where the growth of particles of titanium dioxide is extremely rapid and objectionable deposits of solid material can form about the burner and in other spots in the reaction chamber to seriously hamper or stop steady flow operation, we have found that the hydrolysis operation operated according to our invention principles gives a much slower growth of the desired particles. Additionally, as an especially unexpected benefit of the operation, such deposits as form on the reactor walls and on the reactant inlets of the hydrolysis zone are much softer, easy to remove in a practical continuous manner, are no impediment to the sustained operation of the equipment, and do not materially affect the quality of the rutile product.

As the rate of particle growth in our operation is comparatively slow, the reaction can be controlled quite simply and readily. From our experience we estimate that the residence time necessary to generate rutile titanium dioxide particles in the high temperature hydrolysis zone must be at least 5 seconds to obtain rutile particles approaching pigmentary size (broadly about 0.2–0.4 micron and ideally averaging about 0.3 micron). For achieving good yields of predominantly rutile pigment directly we prefer to use an even longer residence time, namely, at least 6–20 seconds. The residence time is computed by dividing in consistent units the volume of the reaction zone by the volumetric rate of the reaction zone vapor feed streams at the reaction zone temperature and pressure to yield the dimension of seconds.

Control of the particle size in a reaction with given equipment can be effected differentially in a number of other simple ways. Thus, while we prefer to operate at essentially atmospheric pressure ($\pm$ about 70 mm. Hg) for efficiency and economy, lower pressures can be used which appear to retard growth rate of particle size, and higher pressures can be used, which appear to accelerate such growth rate. Similarly, for efficiency and economy, the vapor feeds to the reaction zone are conveniently entrained in a non-condensable inert gas such as nitrogen, non-reducing flue gas, etc. Greater reaction dilution with such carrier vehicle tends to retard particle growth rate, and the use of more concentrated feeds tends to accelerate such growth rate. For convenience of handling and measurement, we prefer to dilute the reactants roughly up to 50% by volume with inert gas, although we can omit dilution without sacrificing much ease of control on the steam and cut it down to as low as 20% or less with respect to the titanium tetrachloride being fed.

The hydrolysis products from our process need not be quenched rapidly in temperature to prevent fusion of the crystallites into non-pigmentary material. The pigmentary product from our process appears to be less subject to sintering than that from a thermal oxidation of tetrachloride. Hence while cooling of the hydrolysis products can be desirable in some cases for their convenient further handling, it is not a critical operation.

Because of the rapidity and completeness of hydrolysis and the lack of hard, sintered solid deposits on the feed inlets in our process, the design of these feed inlets can be quite simple, e.g., orifices disposed to impinge flows of feed one on another. This is in sharp contrast to the oxidation of the tetrachloride where elaborate reactant mixing and burning devices are used in an effort to avert incomplete oxidation of the chloride. We have found that feed inlet deposits can be effectively prevented from impeding operation simply by tapping the reactant inlet tubes every few minutes. After an hour's running the accumulated soft chips of feed inlet solids and reactor wall solids accretion amount to substantially less than 1% by weight of the pigment produced. These chips can be somewhat gritty, but are not unworkable and can be made into pigments of substantial value by themselves.

We believe that the reaction is somewhat exothermic. Initial and sustaining additional heat for the reaction zone can be provided indirectly through the reactor walls or by exchangers in the reactor, or directly in the reactor by individually heating the feeds, and/or passing in or forming in situ hot combustion products in the reaction zone independently or with either or both feeds. Suitably one or both of the reactants are preheated individually to a temperature above at least 800° C. or to an even higher temperature, e.g., one approaching reaction zone temperature, to make maintenance of the reaction zone temperature efficient. When such combustion products are added to or formed in the reaction zone, it must be realized that the superficial residence time of the feeds in the reactor is lowered and the reactants diluted; this must be accounted for just as if the feeds were introduced into the reactor in diluted form.

To further accelerate formation of particles and to provide additional heat, molecular oxygen, e.g., in the form of air, can be introduced to a limited proportion with the feeds, e.g., in the steam feed (up to about 10–15% of that necessary to react with titanium tetrachloride to give titanium dioxide) or at various points along the flow path of the reaction products in the reaction zone. Optionally, some extra water for reaction can be provided suitably by burning a hydrocarbonaceous or other hydrogen-bearing fuel with molecular oxygen in the reaction chamber, preferably so that a reducing flame is avoided to prevent any substantial production of titanium oxide below $TiO_2$.

As stated above, dilution of the reactants with inert gases such as nitrogen, inert combustion products and the like tends to retard particle growth rate; additionally, dilution of the reactor contents requires a correlative increase in reactor size to obtain necessary residence time for rutile pigment formation in our process. Pigment output rate also is depressed by use of a large molar excess (over titanium tetrachloride) of steam and/or materials which are steam-forming in the reaction zone. Accordingly, we limit the steam: $TiCl_4$ molar ratio to about 4:1 at the highest; additionally, we limit dilution of these reactants in the reactor with inert gases from all sources, e.g., those provided as reactant-entraining agents, those fed to the reactor apart from the reactants, and those generated in the reactor, by operating with an overall reactant feed volume concentration (i.e., molar flow rate of the free steam fed to the reaction zone plus the potential steam from steam-generating substances supplied to the reaction zone plus the titanium tetrachloride fed to the reaction zone divided by the sum of the molar flow rates of all streams fed to the reaction zone) of at least about 50%.

The solid titanium dioxide particles from the withdrawn reaction product stream are conveniently separated from the balance of the stream by gravity or accelerated gravity separation, e.g., using cyclone separator or the like. The hydrogen chloride can be separated from the gas stream suitably by cooling the gaseous products and absorbing the hydrogen chloride in water in conventional fashion. Alternatively, the HCl can be disposed of in other conventional ways, e.g., by neutralization with a base.

The following examples show typical ways in which we have operated our process, but are not to be construed as limiting the invention.

*Example 1*

A vessel of water and a vessel of titanium tetrachloride are maintained in heated liquid condition. Into each vessel is introduced a stream of nitrogen so as to withdraw continuously a vapor of 50% of the reactant and 50% of nitrogen by volume in each stream. These feeds are then separately preheated in an electric furnace to about 900° C. The ratio of feeds is 3 mols of steam per one mol of titanium tetrachloride. The superheated feeds at a slight superatmospheric pressure are passed continuously into a vertical tubular reaction zone to form almost parallel sheets impinging about 3″ below two parallel slit-like nozzles which project a few inches into the reaction zone.

The reaction zone is enveloped in a furnace, and the temperature of the zone is about 950° C. The superficial residence time of the feeds in the zone is about 6 seconds at the prevailing temperature and atmospheric pressure. The superficial velocity of the reactants (based on the volumetric input of reactants and diluent nitrogen adjusted to reaction zone temperature and pressure) is about 0.26 ft./sec. The resulting stream of reactants and products passes downwardly in the heated chamber, a vertical quartz tube set inside an electric furnace. The reaction products travel about 1.5 ft. from the nozzle tips and are withdrawn continuously as a mixed stream into settling chambers maintained at a very slight subatmospheric pressure whereby the titania solid settles. The hydrogen chloride, excess moisture, etc., is withdrawn as vapor from the settlers and passed through a caustic soda solution neutralizing bath.

About once a minute during the operation the reactant feed tubes are tapped lightly on their external extension from the preheating electric furnace. This is adequate to prevent any substantial build-up of solid plugs on the orifices which interfere with the steady operation of the equipment.

The titania product from this operation is removed from the settling chamber and tested by X-ray diffraction. It is about 90% in the rutile state and has a tinting strength measured by the Reynolds Standard of 1000–1100. It is then calcined for a few hours at 750–800° C., thereby being freed from any residual hydrogen chloride, etc., and converted to 100% rutile. It is then ground superficially in a ring roller mill and has a tinting strength of 1500–1600.

The fine pigment portion can be separated by conventional means, e.g., hydro-separation, and added to the steam feed for a further pass in the reactor to be grown to larger size. Alternatively, this material can be fed into a conventional calciner and aggregated to greater size.

*Example 2*

The apparatus used is the same as that of Example 1, and so is the quality of the reactant feed streams. The operation is essentially the same. However, the ratio of feeds is approximately stoichiometric for the reaction $TiCl_4 + 2H_2O \rightarrow TiO_2 + 4HCl$, the temperature of the reaction zone is about 1020° C., the reaction zone pressure is 0.96 atmosphere, the superficial residence time of the feeds in the reaction zone is about 9 seconds, and the superficial velocity of the reactants (based on the volumetric input of reactants and diluent nitrogen adjusted to reaction zone temperature and pressure) is about 0.16 ft./sec.

The titania product from this operation is removed from the settling chamber, neutralized in aqueous suspension with sodium carbonate, coagulated with magnesium sulfate, filtered, the filter cake washed with water until the filtrate is free from sulfate ions, then dried at 110° C. and ground superficially. It is about 94% in the rutile state and has a tinting strength by the Reynolds Standard of 1300.

Because of the corrosive nature of the titanium chloride feed and the wet hydrochloric acid byproduct of the reaction, materials of construction should be corrosion-resistant and capable of withstanding the high temperatures of operation. Vitreous silica, Alundum, and other resistant ceramic materials and ceramic linings are appropriate for the equipment.

By way of contrast to the above process wherein reactant dilution is limited and residence time of reactants in the reaction zone is comparatively protracted and controlled and highly rutilized pigmentary titania results, one can hydrolyze titanium chloride under conditions such as those shown in U.S. Patents 2,990,249 and 3,086,851 whereby ultrafine amorphous or predominantly amorphous titania is formed.

We claim:

A process for making pigmentary rutile titanium dioxide from titanium tetrachloride and superheated steam reactants which comprises:

provididing a plurality of vapor feed streams for a reaction zone which is maintained between about 900° and about 1600° C., at least one of said feed streams containing titanium tetrachloride and at least one other of said feed streams containing superheated steam, said reactants being unmixed with each other;
passing said feed streams into said reaction zone in flows proportioned for supplying from about 2 to about 4 mols of steam per mol of titanium tetrachloride at an overall reactant feed volume concentration of at least about 50%, the flow rates of said feed stream being sufficient for establishing and maintaining superficial residence time of said feed streams in said reaction zone between about 5 and about 20 seconds;
mixing said feed streams in said reaction zone;
withdrawing from said reaction zone a resulting product stream containing highly rutilized pigmentary titanium dioxide solids and hydrogen chloride vapor; and separating said titanium dioxide solids from said hydrogen chloride vapor.

References Cited by the Examiner
UNITED STATES PATENTS

| | | | |
|---|---|---|---|
| 1,451,399 | 4/1923 | Low | 23—202 |
| 1,842,620 | 1/1932 | McInerny et al. | 23—202 |
| 1,967,235 | 7/1934 | Ferkel | 23—202 |
| 2,488,440 | 11/1949 | Schaumann | 23—202 |
| 2,635,946 | 4/1953 | Weber et al. | 23—202 |
| 2,990,249 | 7/1961 | Wagner | 23—202 |

MAURICE A. BRINDISI, *Primary Examiner.*